(12) United States Patent
Murphy

(10) Patent No.: US 6,564,380 B1
(45) Date of Patent: May 13, 2003

(54) SYSTEM AND METHOD FOR SENDING LIVE VIDEO ON THE INTERNET

(75) Inventor: Greg Murphy, Oahu, HI (US)

(73) Assignee: Pixelworld Networks, Inc., Aiea, HI (US)

(*) Notice: Subject to any disclaimer, the term of this patent is extended or adjusted under 35 U.S.C. 154(b) by 0 days.

(21) Appl. No.: 09/490,628

(22) Filed: Jan. 24, 2000

Related U.S. Application Data

(60) Provisional application No. 60/117,439, filed on Jan. 26, 1999.

(51) Int. Cl.[7] ................................................. H04N 7/173
(52) U.S. Cl. .................... 725/86; 725/91; 725/109; 725/114; 348/207.11; 348/211.99
(58) Field of Search ........................... 725/4–5, 8, 25, 725/109, 114, 119, 143, 86; 348/207.11, 211.99, 14.05, 722, 87–100, 211.8, 112, 13

(56) References Cited

U.S. PATENT DOCUMENTS

| | | | | |
|---|---|---|---|---|
| 5,619,247 A | * | 4/1997 | Russo | 348/3 |
| 5,956,716 A | * | 9/1999 | Kenner et al. | 707/10 |
| 5,991,306 A | | 11/1999 | Burns et al. | |
| 5,991,801 A | * | 11/1999 | Rebec et al. | 709/219 |
| 6,011,782 A | | 1/2000 | DeSimone et al. | |
| 6,072,982 A | * | 6/2000 | Haddad | 455/4.2 |
| 6,115,035 A | * | 9/2000 | Compton et al. | 345/327 |
| 6,133,941 A | * | 10/2000 | Ono | 348/15 |
| 6,157,377 A | * | 12/2000 | Shah-Nazaroff et al. | 345/327 |
| 6,160,544 A | * | 12/2000 | Hayashi et al. | 345/327 |

OTHER PUBLICATIONS

"Windows Media Technologies Roadmap", circa 1998, printed fr. http://www.microsoft.com/windowsmedia/en/Features/roadmap.asp.

(List continued on next page.)

Primary Examiner—Kimberly A. Williams
Assistant Examiner—Matthew R Demicco
(74) Attorney, Agent, or Firm—Leighton K. Chong

(57) ABSTRACT

An Internet-based video feed management system controls, manages, and efficiently administers the commercial distribution of live video feeds from on-site video cameras as well as other sources of video feeds to production companies at other locations. The system employs a network of local video-propagation servers located in different localities for receiving the video feeds from the different source locations, and a master authorization server for receiving and granting requests via Internet from requesting parties for access to any of the video feeds transmitted to the video-propagation servers. The master server issues an access code to the requesting party and establishing a unique publishing point for the requested video feed from the video-propagation server handling the feed. The on-site video cameras can supply live video feeds to the requesting parties, or the video feeds can be transmitted to a video-propagation server for storage and later re-transmission. The master server is provided with a master feed list and a pricing table for computing billings to requesting parties, and payments to sources of video feeds. The master feed list is updated by feed listings input to the video-propagation servers. For live video feeds captured by different types of video cameras at the on-site locations, the system allows a requesting party to access the video camera for remote control on the Internet. An universal control panel GUI is provided for the browser of the requesting party, and is used to issue command codes corresponding to the respective video camera type. The system can be used to automatically generate video Web pages hosted on the master server and linked to the clients' Web sites. The master server allows the client to select from different display templates, and to upload their identification graphics for incorporation into the display template with the desired video feed, thereby obtaining a marked reduction in production costs for creating video Web pages for e-commerce, live events programming, etc.

5 Claims, 9 Drawing Sheets

MASTER FEED LIST UPDATED BY LOCAL POPS

OTHER PUBLICATIONS

"Understanding [Microsoft] NetShow Theatre Server", 1996–98, printed from mk@MSITStore:H:\NetShow%20Theatre \Docs\Html\NetShowTS.chm::/nsp_pwe1_jtx-o.htm.

"MAXi.c.Live 3600" (Specifications), circa 1999, printed from http://www.maxic.com/10_Product_Information/10_3600/_features.asp.

"broadcast.com, Business Services Overview", 1998, printed from http://business.broadcast.com/overview.html.

"RealNetworks, Streaming Media Buyers Guide", Executive Summary, circa 1998, printed from http://www.realnetworks.com/products/servers/bguide/index.html.

"RealNetworks, RealSystem G2", circa 1998, printed from http://service.real.com/help/library/guides/production/htmfiles/whatsnew.htm.

"RealNetworks, RealSystem Presentations", circa 1998, printed from http://service.real.com/help/library/guides/production/htmfiles/realsys.htm.

"Sigma Designs Product: NetStream 2", circa 1999, printed from http://www.sigmadesigns.com/product_ns2.htm.

"Manchester Code", a code in which clock and data signals are combined in . . . a self–synchronizing stream, Aug. 1996, printed from http://www.its.bldrdoc.gov/fs–1037/dir–022/_3206.htm.

"Manchester Coding", a method of synchronizing data transfer, circa 1996, printed from http://www.hotlinks.net.au/hwiebell/WebTech/Collisions/Intro.htm.

"Web Workshop—Windows Media Server", Feb. 2000, printed from http://msdn.microsoft.com/workshop/imedia/windowsmedia/solutions/tv/tvlive_server.asp.

"Web Workshop—Microsoft Windows Media Rights Manager", Jul. 1999, printed from http://msdn.microsoft.com/workshop/imedia/windowsmedia/solutions/wmr.asp.

"Web Workshop—Packaging Content Using Windows Media Rights Manager", Apr. 1999, printed from http://msdn.microsoft.com/workshop/imedia/windowsmedia//DRM.asp.

Sensormatic Speed Dome Ultra IV, programmable dome camera, circa Dec. 1998, product literature.

iCAST.com, entertainment destination site on the Web, circa 2000, printed from http://www.icast.com/community/1,1521,496,00.html.

* cited by examiner

ON-SITE VIDEO CAMERA AND CONTROL

MASTER FEED LIST UPDATED BY LOCAL POPS

| Pricing Table | | |
|---|---|---|
| Service | Permissive Use | Price |
| Direct Feed Model | Direct link to video feeds at 300k connection speed for receipt of live video, stored video and video on demand | |
| All Access | Authorization for all video feeds | $X1 per month |
| All Sports | Authorization for all sports video feeds | $X2 per month |
| All Music | Authorization for all music video feeds | $X3 per month |
| All News | Authorization for all news video feeds | $X4 per month |
| Select Sports | Authorization for access to specific sports (e.g. SurfingLive, WatersportsLive, MotorsportsLive) | $XX per month, varying prices depending on sport selected |
| Select Music | Authorization for access to specific music (e.g. JazzLive, HawaiianMusicLive, UndergroundLive) | $XY per month, varying prices depending on music selected |
| Select News | Authorization for access to specific news (e.g. local feeds, statewide feeds and international feeds) | $XZ per month, varying prices depending on news selected |
| Syndication Model | Publishing point access for third-party private label single use and broadcast of specific selected content | |
| Live and Stored Video | Access to a single stream for live or stored content | $X5 access fee (amount depending on content chosen) PLUS<br>$0.XX per click through up to 56K<br>$0.XX per click through up to 128K<br>$0.XX per click through up to 300K |
| Video on Demand | Access to a single video on demand file to be downloaded by customer and delivered through customer website and delivery network | $X6 Per minute of video (amount depending on content chosen) |
| Single Event Purchase | Direct link or publishing point access for use and broadcast of a single live or stored event | $X6 Per minute of video (amount depending on content chosen) |
| Exclusive | No other customer may receive or broadcast event | Full production cost of event PLUS $X7 access fee PLUS<br>$0.XX per click through up to 56K<br>$0.XX per click through up to 128K<br>$0.XX per click through up to 300K |
| Non-exclusive | Any customer may receive or broadcast event live or at any time in future | $X8 access fee PLUS<br><br>$0.0X per click through up to 56K<br>$0.XX per click through up to 128K<br>$0.XX per click through up to 300K |

FIG.6

SAMPLE CAMERA CONTROL BROWSER INTERFACE

REMOTE CONTROL OF VIDEO CAMERA

SYSTEM AND METHOD FOR SENDING LIVE VIDEO ON THE INTERNET

This U.S. patent application claims the priority of U.S. Provisional Application No. 60/117,439 of the same title, filed by the same inventor on Jan. 26, 1999.

FIELD OF THE INVENTION

This invention relates to a system for sending live video on the Internet and, more particularly, to a new system for controlling, managing and distributing live video feeds generated from multiple, remote-controlled video cameras installed on-site in locations distributed throughout a region or the world.

BACKGROUND OF THE INVENTION

Online user interest in digital video and broadband video services is growing currently at an exponential rate. Whether for video downloads, video conferencing, or news video services at work, or broadband video services, video-on-demand, or interactive TV services at home, online users are attracted by the huge qualitative difference in viewing experience and visual interactivity of online video services. Cable operator companies are upgrading their cable distribution facilities to greatly increase the available bandwidth to handle online video services and provide two-way connectivity for interactivity functions for their subscribers. Telephone operating companies are offering T1, fractional T1, and digital subscriber lines (DSL) that have the high bandwidth capacity to handle online video services. Satellite distribution companies also can provide high bandwidth downloading of online video services which can be combined with a telephone line back channel for two-way connectivity. These high bandwidth distribution systems also have the advantage of being "always on" to the subscriber, thereby making their viewing experience as accessible and familiar as turning on the television. At the same time, Internet webcasting companies are making use of advanced compression technologies to offer acceptable quality video on the public Internet at common PC modem connectivity bit rates.

Cable operating companies currently reach about 70 million of the 110 million households in the U.S., and expect to have high bandwidth cable facilities upgraded to be available to over 80% of their cable customers by end of Year 2000. Industry analysts project that anywhere from 30% to 70% of all cable customers will become subscribers to interactive TV and online broadband services by 2004. Through their upgraded plant, the cable operating companies will change over their analog TV signals to digital TV signals (as mandated by the FCC by 2002), and have the bandwidth capacity to offer in the range of 500 channels of digital TV, as well as broadband Internet connectivity to their subscribers. Similarly, the number of telephone line subscribers (primarily businesses) to T1, fractional T1, and DSL lines is expected to grow from the current 10 million to over 40 million subscribers by 2004. As the number of online users having access to high bandwidth for digital TV and online video services increases rapidly, thousands of new digital TV and video production companies are expected to be formed to create programming for the hundreds of available new channels in the cable service areas and the millions of Internet sites that can be enabled with online video services, and all of them will need new video content.

The production of TV-quality content is currently very expensive to produce. Typically, a TV or video production entails high costs for staging and taping or filming in a studio. If the production is interspersed with content gathered from the field, camera crews must be dispatched on-site to gather these feeds. If the location of the shoot in the field is in another city or country, large travel and road crew operating costs are incurred. The feeds recorded from the field must be taken back to the studios for editing with the other taped or filmed footage. Large delays in time and waste of personnel time are incurred by the current field-to-studio sourcing of content. Only the large, nationally syndicated TV broadcasting companies can afford to create TV-quality content on a consistent on-going basis. The thousands of new production companies operating on startup or small-company budgets will have a difficult time, if not be precluded from, producing TV-quality content by the current regime of high production costs.

The viewing of live events over TV or on the Internet provides an immediate, emotional impact to the public. As millions of new sources of content are offered on digital TV channels and on Internet sites, content that is live and local will be in high demand to capture viewers' interest. Similarly, video ads and other commercially sponsored content that covers local events and captures familiar faces and places will have a far greater impact on the viewing, purchasing public than generic content. However, the problem of high costs to capture live events by sending camera crews into the field will make it difficult for the new, smaller production companies to obtain live video feeds and employ them for TV or video production.

There have been some recent developments to use video cameras installed at on-site locations to provide video coverage from the field to an off-site location where the video feeds can be viewed or edited. In the security camera industry, software remote controllers are used to control on-site video cameras linked to a control station by dedicated lines. Sensormatic Electronics Corp., of Boca Raton, Fla., is offering security video cameras that can be controlled by software controllers over an Internet TCP/IP connection. Eyecast.com, of Herndon, Va., is offering a service for uploading security camera feeds via Internet connection to a Web server to preserve the feeds from loss or tampering. Perception Robotics, Inc., of Evanston, Ill., offers a system for viewing a live video feed from the field via Internet and remotely controlling the camera through a Web page menu of camera control parameters.

Other recent developments include media management systems that allow an Internet service provider to manage the use of streaming media on the Internet. For example, Microsoft Corp., of Redmond, Wash., offers the Windows Media Management System which tracks the use of streaming media files accessed or distributed from an ISP's Web site. Broadcast.com, of Dallas, Tex., offers the service of hosting streaming media programs for client companies on its Web site. MAX.i.c.Live, of Dallas, Tex., offers the 3600 System that can access multiple live video feed sources simultaneously via Internet for off-site video processing. A video asset management system is offered by a joint venture of Excalibur, a U.K. company, under the tradename Screening Room™, and INTERVU Network, Inc., of Mountain View, Calif., to provide video content owners and creators with video logging, searching, re-purposing, distribution and publishing capabilities. However, these recent developments do not provide a comprehensive solution for managing the accessing, transmission, distribution, and transacting of large numbers of video feeds captured live from on-site video cameras and from other video sources to large numbers of video producers, intermediaries, and end users at dispersed locations.

SUMMARY OF THE INVENTION

A primary objective of the present invention is to provide an Internet-based network system for controlling, managing, and efficiently administering the commercial distribution of live video feeds from large numbers of on-site video cameras to large numbers of production companies at other locations. The system should also have the capability to handle stored video feeds or pre-recorded video feeds provided from other sources, in addition to the live video feeds from on-site cameras. Another important objective is to create a video feed management system having a facility for authorizing and tracking accesses by different video producers to any of a large number of video feeds from different sources based upon a computerized feed list and pricing table, in order to generate a billing statement for each video producer and a payment statement to each video feed source. A specific object of the invention is to facilitate the remote control of a wide range of installed video camera types from any location via commonly used Internet browsers. Another specific object is to enable the automated production of commercial Web-based advertising, live events programming, etc., incorporating live video feeds using the described Internet-based video feed management system.

In accordance with a first aspect of the present invention, a video feed management system (and related method) comprises: (a) a plurality of video feeds generated from respective video cameras located on-site at a plurality of locations, said video feeds being transmitted via Internet to a designated local propagation server; (b) a plurality of local video-propagation servers located in respective different localities for receiving via Internet the video feeds from the respective video cameras located on-site at locations in respective ones of the different localities; and (c) a master authorization server connected to the Internet for receiving requests via Internet from requesting parties for access to any of the video feeds transmitted to any of the video-propagation servers and granting a requesting party access to a requested video feed through the video-propagation server receiving the requested video feed. In a preferred embodiment of the video feed management system, the master authorization server grants access to a requested video feed by issuing an access code to the requesting party and establishing a unique publishing point for the requested video feed from the video-propagation server handling the feed, which can be accessed by the requesting party using said access code. The on-site video cameras can capture video feeds of live events and transmit them to the video-propagation servers for access by requesting parties as live video feeds. Alternatively, a live video feed transmitted to a video-propagation server can be stored or cached in a video data storage provided with the propagation server, from which it can be re-transmitted later upon request.

In accordance with a second aspect of the invention, a video feed management system (and related method) comprises: (a) a plurality of video feeds obtained from respective local sources of the video feeds; (b) at least one video-propagation server for receiving the plurality of video feeds from the local sources and allowing access via Internet to any requested video feed by a requesting party in accordance with authorization granted therefor; (c) a master authorization server connected to the Internet for receiving requests via Internet from requesting parties for access to any of the video feeds transmitted to the at least one video-propagation server and granting the requesting party access to the requested video feed from the video-propagation server; and (d) said master authorization server being provided with a computerized pricing table for computing a billing rate for the requesting party for access to the requested video feed, in order to generate a billing statement to the requesting party for use of the video feed. The master authorization server is also provided with a computerized video feed list that is updated by the at least one video-propagation server with video feed listings of the video feeds transmitted to the at least one video-propagation server. The master authorization server tracks any access requested for a video feed from the video feed list and computes a payment rate for the source of the requested video feed, in order to generate a payment statement to the source for access to the video feed.

In accordance with a further aspect of the invention, a video feed remote control system (and related method) comprises: (a) a plurality of video feeds generated from respective video cameras located on-site at a plurality of locations, said video cameras being of a predetermined different video camera types; (b) a plurality of video camera computers operable with respective ones of the video cameras for controlling them to generate the respective video feeds therefrom and transmit them to a designated local video-propagation server, said video camera computers being connected to the Internet and addressable by respective IP addresses; (c) at least one video-propagation server connected to the Internet for receiving via Internet video feeds from the respective video cameras located at the on-site locations; (d) a master authorization server connected to the Internet for receiving requests via Internet from requesting parties for access to any of the video feeds transmitted to the at least one video-propagation server and granting a requesting party access to a requested video feed from the video-propagation server receiving the requested video feed; and (e) a universal control panel graphical user interface (GUI) provided on a browser-enabled computer operated by the requesting party for controlling any of the different video camera types used to generate the video feeds, wherein upon granting a requesting party access to a requested video feed, said master authorization server provides to the requesting party an identification of the video camera type and the IP address of the computer for the video camera generating the requested video feed to enable the requesting party to issue control signals for the corresponding video camera type to the IP address of the computer for the video camera generating the requested video feed.

In a preferred embodiment, the universal control-panel GUI is provided with a plurality of browser-based GUI files on a browser-enabled computer of a requesting party. Each browser-based GUI file corresponds to a respective one of the different video camera types, and enables a display of the universal control panel GUI on the requesting party's computer and issues a respective set of command codes for inputs to the universal control panel GUI corresponding to the respective video camera type. In an alternative embodiment, the universal control-panel GUI is provided as a browser-based GUI file on the browser-enabled computer of a requesting party, and the at least one video-propagation server is used to provide a link to the computers for the respective video cameras. A conversion module is maintained with the video-propagation server for converting universal command codes issued from the universal control panel GUI on the requesting party's computer into command codes corresponding to a respective one of the different video camera types.

In accordance with another aspect of the invention, an automated video Web page generating system (and related method) comprises: (a) a plurality of video feeds obtained from respective sources; (b) at least one video-propagation server connected to the Internet for receiving the plurality of video feeds and transmitting a video feed requested by a requesting party on the Internet; (c) a master authorization server connected to the Internet for receiving a request via Internet from a requesting party to use any one of the video feeds in a requested display presentation format in conjunction with a video Web page to be linked to a Web site maintained by the client company; and (d) said master authorization server being provided with a video Web page generation module for automatically generating a video Web page in the requested display presentation format using the requested video feed, and linking the generated video Web page to the requesting party's Web site.

In a preferred embodiment, the master authorization server allows the requesting party to select from a plurality of stored display templates for different display presentation formats, and to upload the requesting party's identification graphics to the master server for incorporation into a selected display template. Such a system can be used to automatically generate video Web page ads for a client company by offering a selection of ad display templates for use with their identification graphics and any requested video feed. Similarly, licensed affiliates or video production companies can request automatic generation of live events programming (sports, news, weather, traffic, cultural events) as video Web pages hosted by the Master site which are linked to their Web sites.

The system is intended to accomplish a marked reduction in production costs for creating video Web pages for e-commerce, live events programming, etc., by automatically generating such video Web pages and hosting them on the Master site for the video feed management system. An automated billing and payment system is provided with the Master server to generate billing statements to client companies and payment statement to video feed sources. To prevent de-linking of and unauthorized access to the video feed used in the video Web page, the Web page can be converted to a composite video image of the requested video feed and the requesting party's identification graphics.

These and other objects, features, and advantages of the present invention are described in detail below in conjunction with the following figures:

DESCRIPTION OF DRAWINGS

FIG. 6 is a diagram illustrating an example of a Pricing Table for pricing access to a requested video feed by a requesting party.

DETAILED DESCRIPTION OF THE INVENTION

The following description describes a preferred embodiment of a video feed management system and its advantageous features and functions in accordance with the invention. However, it is to be understood that the described embodiment is intended only to be exemplary of one application of the invention, and does not exclude any other adaptations and variations thereof.

The term "video feed" as used herein is defined as any streaming video content, which can be accessed by a remote connection. This streaming video content can be comprised of video and/or video with audio, delivered either on demand by accessing a stored digital file or live from a remote capture source, such as a video camera. The source content may be encoded by a computer at the site of the remote capture device(s) to create a streaming video/audio file in a desired format, such as an Advanced Streaming Format (ASF) file or a Real Video/Audio file or a streaming QuickTime file. The streaming file is a continuously delivered series of packets of digital data, receivable by a remote computer, which if running the appropriate software using appropriate plug-ins or codecs, can decode the stream as video content. The appropriate software running on the receiving computer is dependent on the type of streaming file. For example, ASF streaming files are playable by a Windows Media Player, offered by Microsoft Corp.; Real Video/Audio streaming files are playable by the Real Video Player, offered by Real Corp.; QuickTime streaming files are playable by the QuickTime Player, offered by Apple Computer Corp. Stored digital video/audio files which are made available on-demand (i.e., playable whenever the end user wishes to) can also be considered video feeds. On-demand streaming video content is delivered using the same file types as the live streaming video content and playable using the same appropriate players.

Video feeds may be used to view captured live content or to view or scan stored video content. High-resolution video content that is to be used or purchased by the end user may also be made available as downloadable digital files, such as the following types: Digital Video (DV), QuickTime, Audio Video Interlaced (AVI), Motion Picture Engineers Group (MPEG), Wave Audio (WAV), or MP3 (MPEG-3, audio only). On-demand streaming video/audio files can be used to preview available content before a transaction is made. Then the identical content, once selected, can be licensed or purchased in one or more of the high-resolution file types listed above and downloaded.

Figure 1:
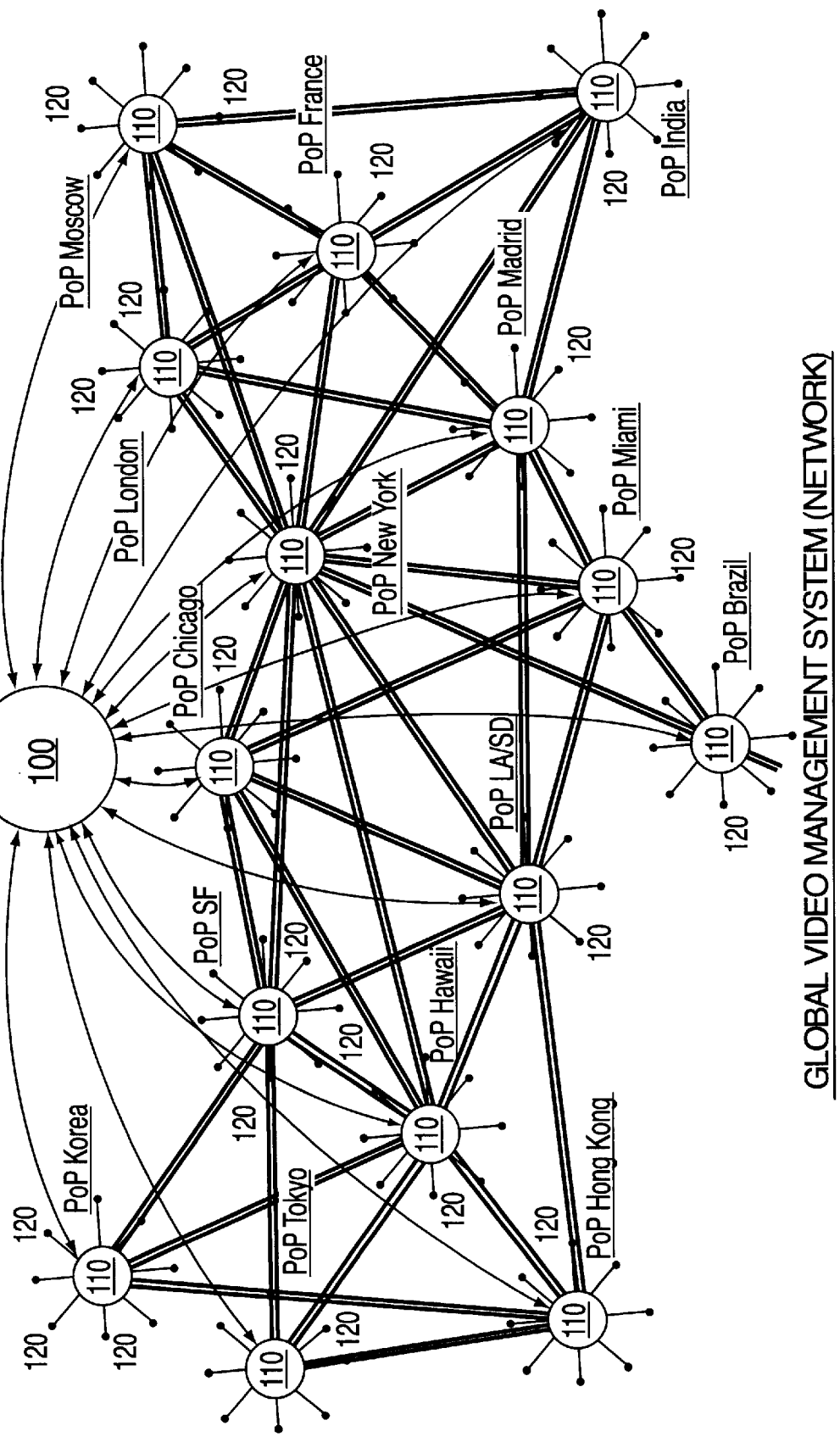
FIG. 1 is a diagram of a video feed management system in accordance with the present invention comprised of a network of master server, local points-of-presence (PoPs), and video feed sources.

Referring to FIG. 1, a global video feed management system has a Master Authentication Server 100 connected in communication with a plurality of local, point-of-presence (PoP) servers 110, represented here as being located in major cities of the world deemed to have local content, news, culture, and/or live events likely to be of high interest to network users throughout the world. Each of the PoP servers is connected to a plurality of sources 120 of video feeds (represented by point-and-line tentacles) which provide the video feeds for transmission to video production intermediaries and ultimately to end users connected to the network (not shown in the figure). The system's network connects all video feed sources, PoP nodes, intermediaries, and end users by data transmission lines or connections that form a part of a global digital data packet-switched network commonly referred to as the "Internet". The term "Internet" is used herein in the generic sense of a "network of networks", including the public Internet, LANs, WANs, intranets, extranets, overnets, wireline, wireless, satellite, optical, and all other types of data transmission networks.

Each PoP server 10 is connected to one or more other PoP servers by high bandwidth connections (represented by double lines). The PoP servers are indicated as being located in respective major cities of the world. However, they may be located, clustered, and/or distributed in any manner that is quickest, efficient and cost effective for the transmission of video feeds to users throughout the world. The high bandwidth connections are indicated as running between PoP servers in geographical proximity or alignment with other PoP servers. However, they may be connected in any manner that is quickest, efficient and cost effective for the transmission of video feeds across the high bandwidth PoP nodes of the network.

The Master Authorization Server 100 and local PoP servers 110 are resident as Web sites on the Internet accessible by IP addressing. The Master Web site is the home site for the system's network, and is the site to which users of the system log on to find what video feeds are available and to request and contract for access to a desired video feed. The local PoP Web sites are the home sites for local network affiliates who are responsible for contracting the supply of video feeds from local sources for the system. The video feeds generated by the local sources are transmitted to the local PoP server's IP address for handling in the system. The sources 120 of the video feeds may also have unique IP addresses. An IP address for a local source is needed in the case where the source is to be addressed on the Internet by a remote party seeking to control a video camera capturing a requested video feed.

The sources of video feeds may be of any type, including sources of live video, stored video, edited video, video-on-demand, digital TV video programming, pay-per-view, telemedicine, distance learning, video conferencing, etc. For purposes of the described embodiment, live video feeds captured by video cameras at on-site locations are described herein to illustrate the transmission and management of video feeds by the system's network. However, it is to be understood that the principles of the invention disclosed herein apply as well to any other types of video feeds. Live video feeds are chosen for illustration because it is believed that live video is the most compelling form of content to users throughout the world since it provides the immediacy and impact of viewing unique people, places, cultures, and events live.

On-Site Video Cameras

Figure 2:
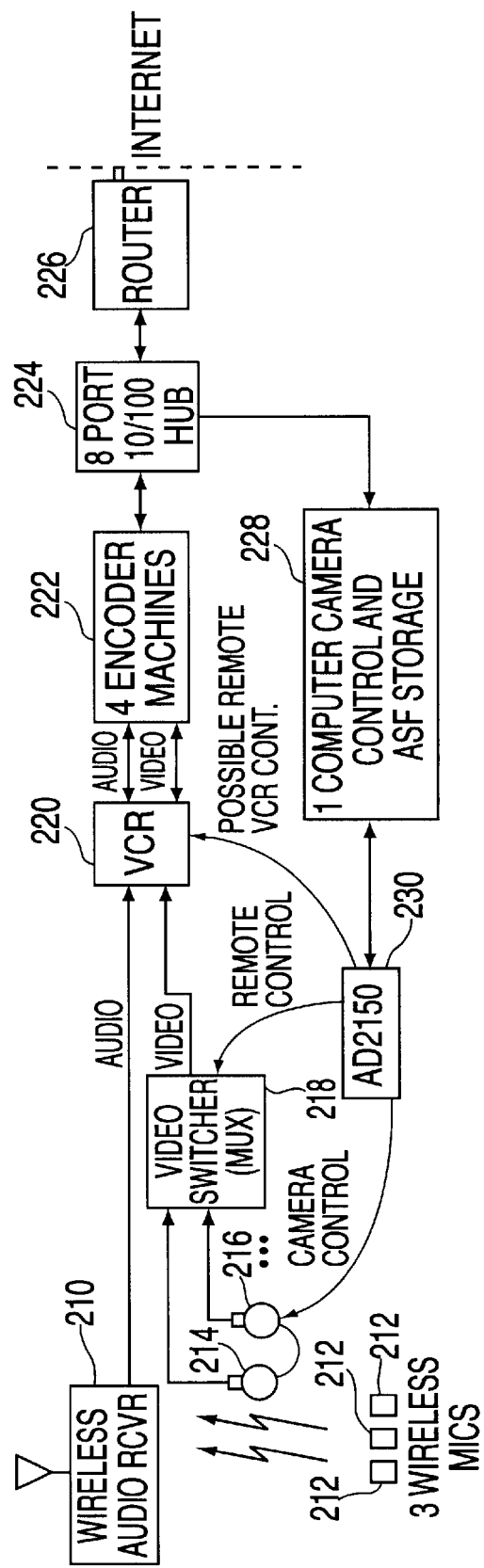
FIG. 2 is a diagram of video camera and control computer equipment for an on-site video camera installation.

Referring to FIG. 2, an example of an on-site video camera and control for providing a live video feed to the system's network is illustrated having one or more video cameras 214, 216, etc. for capturing a live event at a given location. The video cameras are coupled to a video switcher 218, which can be switched, manually or by remote control, between the different feeds from the cameras or to a multiplexed feed showing all feeds in separate windows. Wireless microphones 212 are provided for sound capture, sending their output signals to a wireless audio receiver 210. The video output from the video switcher 218 and audio output from the receiver 210 are sent to a VCR 220 for recording a backup tape of the event and on to an array of encoders 222. Multiple encoders are used to encode the video feed signal(s) into different data formats and/or with different levels of data compression as required for the video feed system. The digitally encoded outputs are sent to a hub 224 which handles the multiple encoded outputs, then to a router which operates as an interface to the Internet connection linking the video feed source to a local PoP server.

The video cameras 214, 216, etc., can be positioned at different sight angles for recording a single live event, or can each be positioned to record a separate live event in proximity to each other at the same location. In accordance with the business model of the video feed management system to greatly reduce the production costs of capturing video feeds of live events, the video cameras may be installed in fixed locations around a stage or other performance venue at a given source location. By controlling the cameras remotely through the Internet (to be described in further detail below), the need to send a live camera crew on-site at particular hours and/or on particular days for live performances can be avoided. Instead, live events can be performed on the stage at any time or day and captured automatically by the installed cameras under remote control. Alternatively, some of the cameras may be installed at fixed locations, and one or more other cameras can be operated by a camera crew for roving interviews or for zooming in on persons or events occurring outside of the sight angles of the fixed cameras. Used in this manner, the on-site video switcher 218 can be viewed as a video feed portal to the network into which any source of video feeds can be plugged, thereby providing the producer of the video production with the flexibility to obtain feeds from movable or fixed cameras, under remote control or human operation, or even from a stored, recorded, or uploaded video feed source.

A useful type of video camera that may be used in a fixed installation on location may be such as those used in the security camera industry, e.g., the Speed Dome Ultra™ sold by Sensormatic Electronics Corp. This type of camera can rotate 360 degrees and follow and zoom in on a moving object in the scene. The camera eye captures the field with a charge-coupled-device (CCD) photoarray capable of providing a high-resolution output at 30 frames/second for full motion video. Typical camera controls include pan, tilt, zoom, iris adjustment, and focus. The video camera can be programmed to shoot particular views in particular patterns. A particular script or program for a sequence or salvo of views and patterns can be set up with the controller computer 228 to operate the camera automatically to follow the script.

The output of the video camera may be in the common NTSC or PAL video format or in the broadcast quality Digital Video (DV) format. DV is a video format that uses a minimal compression scheme (referred to as 4:1:1), and thus has a high data rate of 25 to 50 Mbps. It would be used as a source capture format for purposes of optimizing image quality for encoded feeds, or for archiving material at broadcast resolution (archived in DV format). Since the commonly used T1 line or cable modem line for user-level Internet connections can only carry about 1.5 Mbps, the on-site video camera equipment illustrated in FIG. 2 would have to be modified to include a digital storage device for storing the source video feed in DV format. A director of a production company at a remote location can watch the live feed and control the camera by viewing the feed encoded and sent at 300 Kbps (or lower) quality, then later request transfer of the saved high-quality DV files for selected scenes.

The video switcher may be an RV2216 Switcher sold by Sensormatic Electronics Corp., which can handle multiple cameras (4). The video switcher 218 can be controlled remotely by control signals issued from the controller computer 228 to switch views between any of the cameras or to output a multiplexed view of all cameras, and the output is sent to the VCR 220. The VCR 220 is not a necessary part of the system for purposes of the invention, but is normally required by a producer of a live event and/or owner of the video feed to protect against possible loss of the video feed in transmission. The VCR 220 is coupled with a splitter to split the video feed into multiple feeds to the array of encoders 222. If the video camera output is in DV format, a digital storage medium is used in place of the analog-recording VCR 220.

The encoder array includes a number of encoders for encoding the video feed signal into the chosen digital video and file formats, compression methods, and data transmission speeds being supported by the video feed management system. The digital video format may be older multimedia formats such as AVI or WAV, or more recent standards for rich media interchange such as Advanced Authoring Format (AAF) or DV. The video compression method may be an older method, such as MPEG-1 or MPEG-2, or the more advanced MPEG-4 that can achieve data compression ratios of 100:1. The compression methods can also differ depending upon which multimedia file formats are being supported, e.g., QuickTime™ format of Apple Computer Corp., Cupertino, Calif., RealVideo™ G2 of Real Networks Inc., Seattle, Wash., Windows Media™ Player of Microsoft Corp., Redmond, Wash., and others. Encoding in multiple multimedia formats provides the flexibility to reach wider audiences through cross-format compliance.

The encoder array also provides encoding for different data rates at which audiences are connected to the Internet. For example, encoders may be provided for encoding at 28 K, 56 K, 128 K, and 300 K byte data transmission speeds. The 28 K data rate is for an older class of modem-connected terminals and computers widely used on the Internet, whereas 56 K data rate is for the current class of end user terminals. The 128 K data rate is for terminals with a mid-range level of broadband connectivity and 300 K is for a high level of broadband connectivity to the Internet, such as available with T1 lines, cable modems, and DSL lines. Hardware encoders are more costly but perform the encoding function faster than software encoders. An example of a hardware encoder for the MPEG-4 compression method is available from Xing Corp., a subsidiary of Real Networks. An example of a hardware encoder for the multiplexed view from multiple video cameras is available under the name NetStream2 from Sigma Designs, of Milpitas, Calif.

The encoder outputs are coupled through hub 224, and transmitted as packetized data through router 226. As examples, the hub can be a Workgroup 8-port 10/100 Hub sold by 3Com Corp., of San Francisco, Calif., and the router can be a Model 1600 sold by Cisco, Inc., of Mountain View, Calif. A firewall may be set up on a firewall computer (not shown) between the router and the hub for security against hacker attacks or viruses transmitted from the external network.

The camera controller computer 228 is used for control of one or more of the video cameras. For advanced security video cameras, the controller computer is typically provided as an on-board computer in a console for the camera equipment. The controller computer can be programmed to control the video camera in a script of view sequences or salvos. The video camera can be operated under remote control by control data sent through the Internet to the camera's controller computer. Preferably, the controller computer is registered with an IP address so that an external party can directly address it. Remote control data are received through the router 226 and hub 224 to the controller computer 228, which converts the data (e.g., from standard Manchester text code form) into digital control signals recognized by the corresponding types of video cameras 214, 216, etc., and video switcher 218. Although similar in many of their functions, video cameras and video switchers commonly employ control code sets that may differ according to camera model, type, or brand. The digital control signals are converted to analog form (voltage levels) by an A/D converter 230 which outputs them to the respective camera or video switcher units.

Camera controller computers widely used in the security industry have been software-based and have been primarily employed for manual operator input on-site at the camera location. As interest has increased in remote control of cameras via Internet, there are currently under development so-called Custom Interface Modules (CIMs) configured as a hardware interface between an Internet connection and the control signal outputs to the video cameras. The CIM has a hardwired layout to convert the control data coming from the Internet in standard text form (Manchester code) to analog control signals for directly controlling the camera. The CIM can perform this conversion almost instantaneously, and greatly reduce the latency time for remote control via Internet. An example of a company that is developing hardware CIMs for Internet-based remote camera control is Oasis Corp., of Branson, Mo.

Video/Propagation (PoP) Server

The preferred video feed management system of the invention obtains all of the video feeds generated or sent from the local sources and sends them through a local network node, referred to as a point-of-presence (PoP). Each local PoP tracks the availability of video feeds from local sources and sends updated video feed information to the Master Authorization Server 100 for consolidation into an updated Feed List. The local PoP operates with the Master server to coordinate access to and transmission of a requested video feed to a requesting party authorized by the Master server. To authorize access to a requested video feed, the Master server issues a unique access code to the requesting party and an access confirmation message to the local PoP handling the requested video feed.

Figure 3:
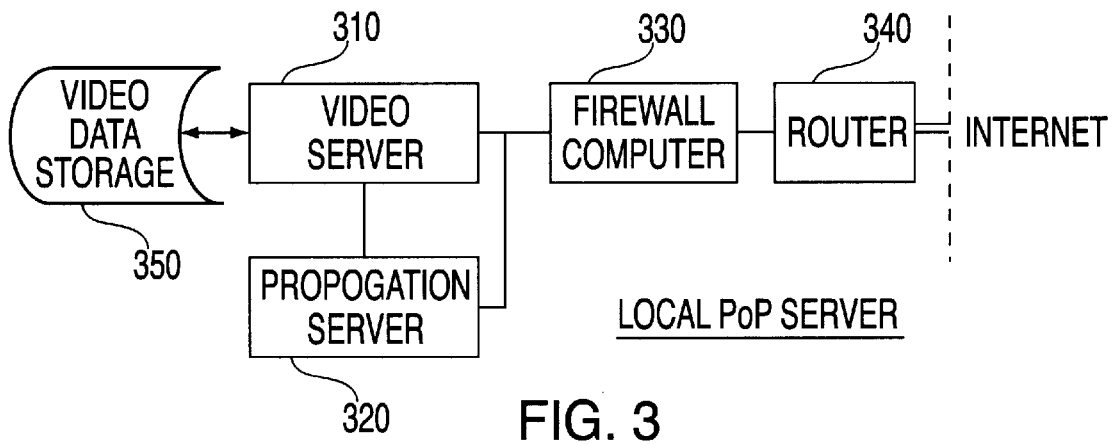
FIG. 3 is a diagram of a video/propagation server at a point-of-presence (PoP) node of the video feed management system.

Referring to FIG. 3, an example of a local PoP is shown having a video server 310 coupled to a propagation server 320 and connected to the Internet via a firewall computer 330 and router 340. The video server 310 typically receives the video feeds from the local video feed sources through a high-bandwidth Internet connection (T1, DSL, or cable broadband line) to the local PoP. The video feeds are encoded in different formats and data rates depending upon the targeted users of the system. The propagation server 320 manages the video feeds handled by the local PoP, and controls the video server 310 to transmit the video feeds to requesting parties in the requested format and data rate. For example, a highQ data rate (300 Kbps) may be requested by a producer for use for TV broadcasts or full-screen broadband webcasts, a mediumQ data rate (128 Kbps) for commercial uses such as video-enabled advertisements and Web pages, and a lowQ data rate for 56 K or 28 K webcasts. The video server 310 is coupled to video data storage 350 for storing video feeds intended to be archived at the local PoP, for use as stored video feeds.

The local PoP is maintained by a local network affiliate who has responsibility to contract with local sources for video feeds to be supplied to the system, and for ensuring that the video feeds are transmitted into the system's network as contracted. For example, the local network affiliate may contract with a local music club to send a live video feed of a music performance at a certain date and time. The affiliate enters the video feed supply information into a Local Feed List database maintained by the propagation server 320, as well as any changes or cancellations. The propagation server runs a feed list tracking program that determines the new or changed entries added to the local PoP, and periodically sends the updated information to the Master server. The Master server consolidates all of the new or changed entries into its updated Master Feed List. Any party, such as a director of a production company, can log on to the Master server's Web site and view, search, or query the Master Feed List for desired video feeds. When a party has requested and contracted payment for access to a video feed, the Master server sends an access confirmation message to the local PoP identifying the requested feed and access method.

When the Master server sends an access confirmation message to the local PoP, the propagation server 320 decodes the request to identify the requested video feed, data rate, and access method (referred to as a "Publishing Point") by which access is to be given to the requesting party, and communicates the information to the video server. The video server 310 then links the requested video feed to the designated Publishing Point. The requesting party is also sent an access code by the Master server, which includes the address of the designated Publishing Point. The requesting party uses the access code and Publishing Point address to gain access to the video feed linked to the Publishing Point.

A Publishing Point is a temporary IP address set up at the site of the local PoP which is addressed by the authorized party via Internet in order to gain access to the video feed (or other media) linked to that address. A Publishing Point can be designated to remain active at a given time, date, or period, and to be accessible to a restricted number or identity of user(s). For example, a requesting party can designate one or more persons authorized to access a video feed at a particular time, such as a director at a terminal for viewing the video feed and a studio technician at another terminal for capturing the video feed for later editing or re-transmission. As another example, a requesting party can designate a list of subscribers who have paid to view a particular video feed of a live event. Reference is hereby made to the Reference Manual of the Windows Media™ Publisher from Microsoft Corp., of Redmond, Wash., for a more detailed explanation of the use of Publishing Points.

Figure 4:
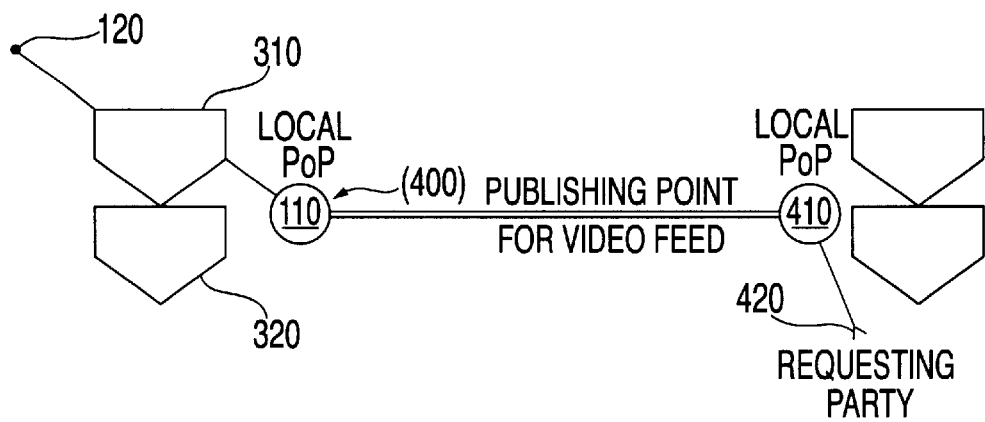
FIG. 4 is a diagram illustrating the setting up of a Publishing Point from a local PoP server nearest the video feed source to a requester located near another local PoP server.

FIG. 4 illustrates an example of setting up a Publishing Point 400 from a local PoP server 110 nearest the video feed source 120 for access by a requesting party 420 located near another local PoP server 410. The video server 310 links the Publishing Point 400 to the requested video feed source 120. The requesting party 420 addresses the IP address of the Publishing Point 400 and the video feed is routed through the PoP server 410 nearest the requesting party. The video feed is transmitted from the PoP server 110 to the PoP server 410 via the high bandwidth connection (indicated by double lines) in the network used by the video feed management system. If the requesting party has requested access to a live video feed being captured by a video camera that can be controlled remotely, the requesting party can send camera control commands to the Publishing Point which are then routed by the propagation server to the IP address of the controller computer for the camera. By using a high bandwidth direct connection between PoPs located nearest the source and the user, and hardware camera controllers and encoders at the source, the video feed and camera control commands can be exchanged with as small a latency delay as possible, in order to give the director remotely controlling the camera a feeling of almost direct response from the camera.

Master Authorization Server

The video feed management system of the invention tracks all of the video feeds from local sources handled by the local PoP servers and makes them available to authorized intermediary users and end users on the Internet. According to a preferred business model, access to the video feeds is managed by the Master Authorization Server by maintaining a Master Feed List of video feeds available at the local PoP servers, which is coupled to a Pricing Table for computing the price for access to be paid by content production intermediaries, and the payment to be made to the video feed sources.

Figure 5:
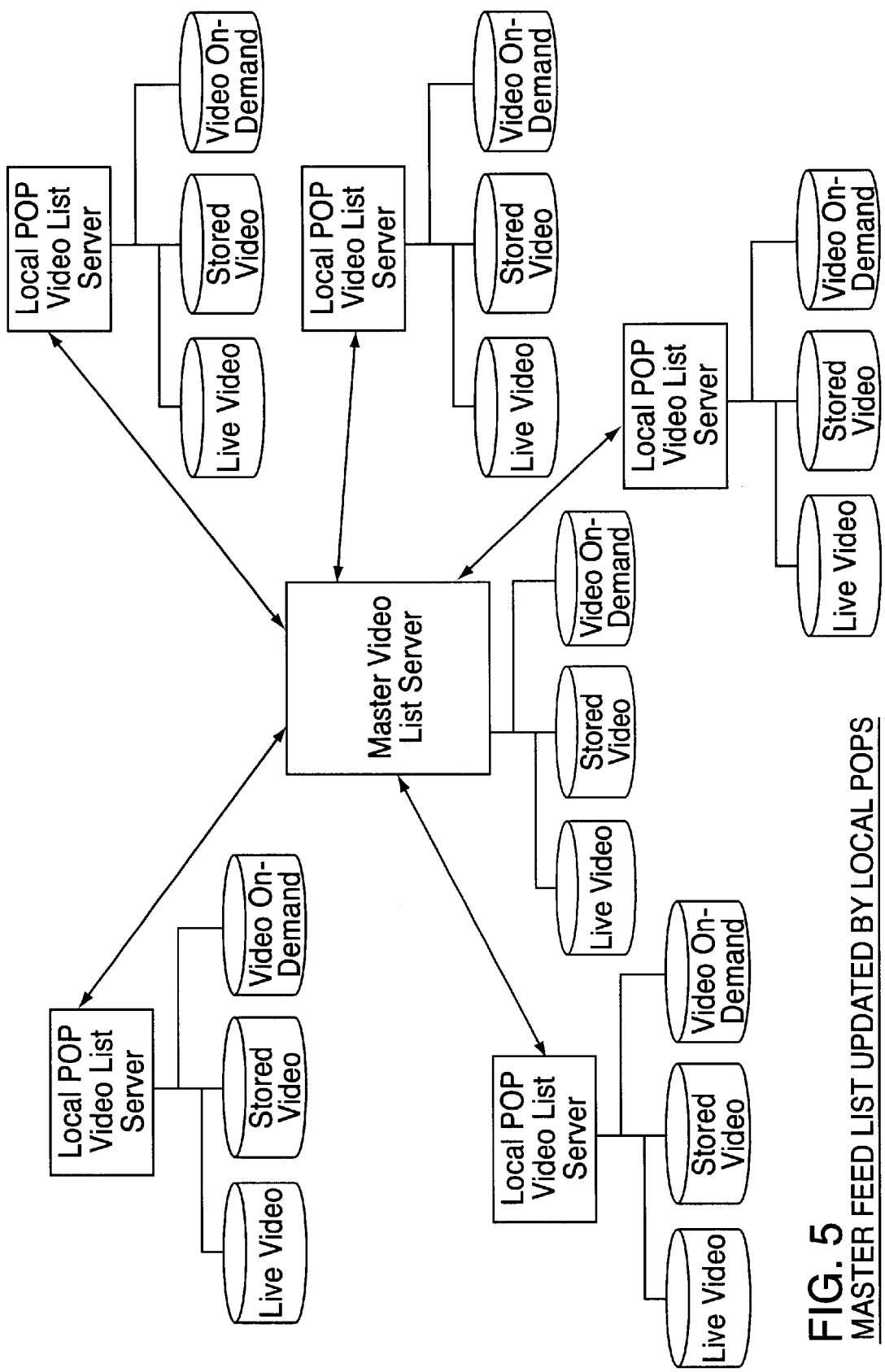
FIG. 5 is a diagram illustrating an example of a Master Feed List maintained at the Master Authorization server.

Referring to FIG. 5, an example of a Master Feed List maintained at the Master Authorization Server is shown. The Master Feed List is continuously updated with feed availability information sent by the local PoP servers. Any party that comes to the Master server site can view it. The Master server can provide user functions such as search and query to assist with finding desired video feeds, or allow the user to profile the types of feeds it may want to access and send automatic notification when such feeds become available. The Master Feed List can include the following categories of video feeds:

(a) Live Video Feeds: These are feeds being captured of a live event at a local source, and are made available to a requesting party at scheduled dates and times for the events. They can include, for example, live performances, telemedicine conferencing, in-classroom distance learning, videoconferencing, or live customer service or sales support. The listing of live video feeds obtained through remotely controllable cameras can be offered to the requesting party with the option of remote control of the capture of a live video feed.

(b) Stored Video Feeds: These are feeds that have been stored at a local PoP server, and can be made available as requested by a party. Typically, the feeds would be stored footage of previous live events that are archived at the PoP for a limited period of time for post-event access. They may also be video recorded or edited by a source and uploaded to the local PoP for temporary storage until accessed by a requesting party.

(c) Video-on-Demand: These are feeds archived by a local source that the local source supplies to a local PoP on demand by a requesting party. The local source can contract to list its titles and supply video on demand through a local PoP into the system's network. The video supplied on demand may be transmitted as streaming media, which is intended to be used in streaming format by the requesting party, or as a licensed media file which can be downloaded by the requesting party for later editing or re-transmission.

Referring to FIG. 6, an example is shown of a Pricing Table used by the Master server for pricing access to video feeds to requesting parties. The Pricing Table can include the following factors for the pricing of access to video feeds:

(a) Feed Quality: Pricing may be tiered according to the media quality level, for example, high quality feeds at 300 Kbps data rate, medium quality feeds at 128 Kbps, or low quality feeds at 56 or 28 Kbps.

(b) Feed Length: Pricing may be computed at a rate based upon the length of the feed, e.g., $x.xx/second of the feed.

(c) Use Rights: The requesting party can pay tiered rates based upon the type of use to be made of the feed, e.g., one-time access to the feed in streaming format, multiple accesses to the feed in streaming format for a specified number of times or time period, exclusive access to the feed during a specified time period, non-exclusive access, or unlimited use of the feed by downloading the media file with rights to edit or create derivative works.

(d) Feed Demand: Pricing can be tiered based upon whether a feed is Live Video, Stored Video, Video-on-Demand, Popular Titles (e.g., Top 100), or Classics.

(e) Remote Control: A premium pricing can be used for the option of remote control of the video camera(s) being used to capture a live feed. A rate schedule can be used which imports component pricing from the source/owner of the on-site video cameras, including number of cameras, types of cameras, multiplex view, switching functions, and length of performance.

The Master Authorization Server employs a media management program for tracking the supply of available video feeds, accesses to the feeds by requesting parties, billings to requesting parties, and payments to video feed sources, as well as other system operational functions, such as transmission load management and usage. The media management program employs the database maintained for the Master Feed List to track the video feed titles supplied by sources to the system and the selections contracted by requesting parties, in order to generate Payment Statements to the sources. Similarly, the media management program employs the Pricing Table and the selections contracted by requesting parties to generate Billing Statements to the requesting parties. Such media management programs have recently come into use by ISPs such as Broadcast.com or Intervu.com which manage the distribution of multimedia and streaming media works for Internet broadband applications. An example of a media management program is the Windows Media™ Rights Management System from Microsoft Corp., of Redmond, Wash., reference to which is hereby made for a more detailed explanation of the functions of the media management program.

Multicasting to PoP Servers: Video-on-Demand

Providers of interactive television and video services on the Internet have attempted to deliver digital video services to a mass audience of subscribers. For example, the goal of media-on-demand services is to permit a viewer to select a movie, video, or audio program from a list of available titles for viewing on TV and to control the viewing of that program in a manner analogous to a VCR, with pause, rewind, fast forward and other viewing effects. Such media-on-demand services generally require a network system in which multimedia programs are stored as digital data on storage media for a media server and sent via network links to individual viewers upon request.

In a commercial media-on-demand system, such as currently offered video-on-demand services, there may be thousands of users in a given service area requesting access to the system at the same time, particularly in the time slot after dinner known as "Prime Time". Many of them may request access to the same titles which are current hits or new releases at the same time or within a short time of each other. To fill each request, the program must be delivered to the viewer as an uninterrupted stream of data. If VCR-like viewing functions are provided, the viewer may want to pause or accelerate the receipt of data.

A major bottleneck is the available bandwidth in accessing and transmitting large video data files or streaming video to meet multiple requests at the same time. For example, to support thousands of viewers during peak usage, conventional video-on-demand systems must employ multiply redundant, high-speed video data processors and large arrays of disk storage media, which is very costly. The present video feed management system can be configured to handle multiple requests from clients by multicasting a video feed from a source PoP server to the other PoP servers for temporary storage there to meet requests from clients near the respective PoP server locations. Referring to FIGS. 1 and 4, upon receiving requests from multiple clients for the same video feed, the Master server can grant access to multiple requesting parties in different regions of the world through multicasting to local PoP servers and establishing Publishing Points for transmission to requesting parties in those regions. This would not only allow multiple requests for the same video feed to be handled at the same time, but it would ensure that the download or streaming transmission to multiple clients was handle through the quickest and shortest transmission paths.

In order to determine which video feeds are to be multicast to all PoP servers, the Master Feed List can be structured to maintain a list of video feeds deemed likely to be very popular, such as the "Top 100 Videos of the Day". The Pricing Table can also reflect appropriate adjustment of pricing for the popular video feeds and the multicast measures taken to ensure that they are readily available to the public at large. Maximum utilization of the available storage at the PoP servers can also be accomplished by planning local PoP data retention based upon a statistical model developed through viewer patterns. For example, it is expected that high demand would occur this for a live event on a Friday or Saturday night during Prime Time (7:00 pm–11:00 pm). To better manage the availability of PoP storage and hence provide better service to a greater number of customers, the system of the invention can track video feed usage across time and generates a statistical table which represents a "Top 100" type of list. This chart can be built on a dynamic basis during a day or peak period of a day.

Remote Control via Internet of Video Cameras

The system of the invention provides the capability for a requesting party, such as a director of a video production, to exercise remote control over one or more on-site video cameras connected to the system's network. This allows the production company to enhance the content quality of the video feed by controlling camera functions that are normally performed by an on-site camera crew, such as switching camera angles, panning, tilting, zooming, or following a person or thing in a scene. Remote control can be made available to the requesting party as an option with a request for access to a video feed being captured live. As described above with reference to FIGS. 2 and 4, a requesting party connected to the Internet at one network location can send camera control data via Internet to the Publishing Point for access to the source of the live feed. The camera control data received at the source IP address are processed by the controller computer 228 at the source location to control the camera(s). A novel browser-based subsystem of the invention to allow a requesting party (e.g., a director of a video production) to exercise remote control of an on-site camera will now be described.

Figure 7:
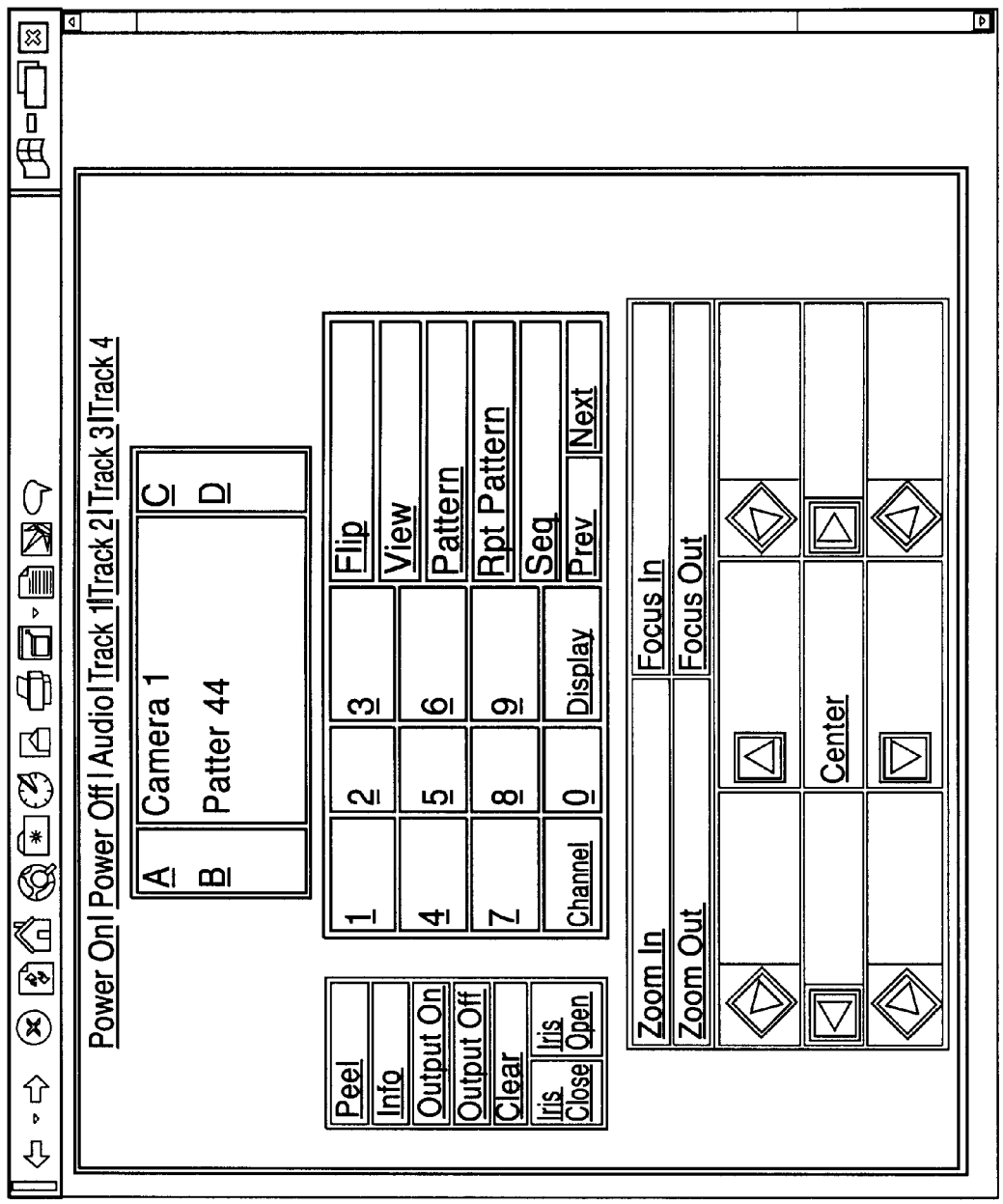
FIG. 7 is a simulation of a browser display of a video feed with control panel GUI for remote control of an on-site video camera supplying the video feed.

Referring to FIG. 7, a simulation is shown of a browser-based display of a live video feed and control panel GUI to allow a director to send control commands via Internet to operate the camera generating the live video feed. The controls on the virtual control panel GUI resemble those commonly provided in actual control panels for commonly used video cameras. For example, controls for Up, Down, Left, Right, Stop, Start, Pan, Tilt, Zoom, Iris Adjustment, and Focus Adjustment are provided. The browser display is launched from a front-end video feed control program run on the director's computer at the remote network location. The front-end program may also be used to launch a simultaneous display in separate windows of the video feeds from the other camera views, and/or a multiplex view (if available) of all of the cameras views at that site. With the multiplex view, the director can highlight any of the views in which adjustment of the camera is desired, then use the control panel GUI to adjust the highlighted camera. When the highlighted camera has been adjusted as desired, the director can then enter a Switch command to switch the live video feed in the first display window to the other camera. In this manner, the director can continually adjust all of the cameras and keep switching the camera views to keep the content of the production interesting to the audience.

The latency time between viewing a live video feed at the director's location and adjusting or switching the camera view of the live feed can be kept to as small a time lag as possible by using fast performing components in the system. For example, it is estimated that the latency time for remote control of a video camera across the United States can be kept under 1 second if the director has high-speed access to the nearest local PoP server, the system's network of PoP servers employ dedicated high-speed, high-bandwidth connections to each other that avoid the public Internet, a high-speed connection is used to connect the local PoP server to the controller computer for the camera(s) at the source, and hardware encoder cards are used. Further improvements in connectivity and the use of hardware Custom Interface Modules (CIMs) to control the cameras can further reduce the latency time to a target of less than 100 msec, which would provide the director with a feeling of almost direct response in controlling the camera.

As explained previously, video cameras and video switchers commonly employ remote control code sets that may differ according to camera model, type, or brand. Remote control software, such as that offered by Oasis Corp., typically outputs ASCII text commands via packetized TCP/IP protocol over a network connection (either dedicated network or public Internet). These ASCII text files are received by the on-site control computer and simply channeled through by what is referred to as an input/output "service". A "service" simply channels the incoming file to the correct port. From there it goes to the camera control software program which takes the command input file (ASCII text) and interprets the correct digital command in the camera control language (Manchester code) and sends it out to the camera for execution.

Figure 8:
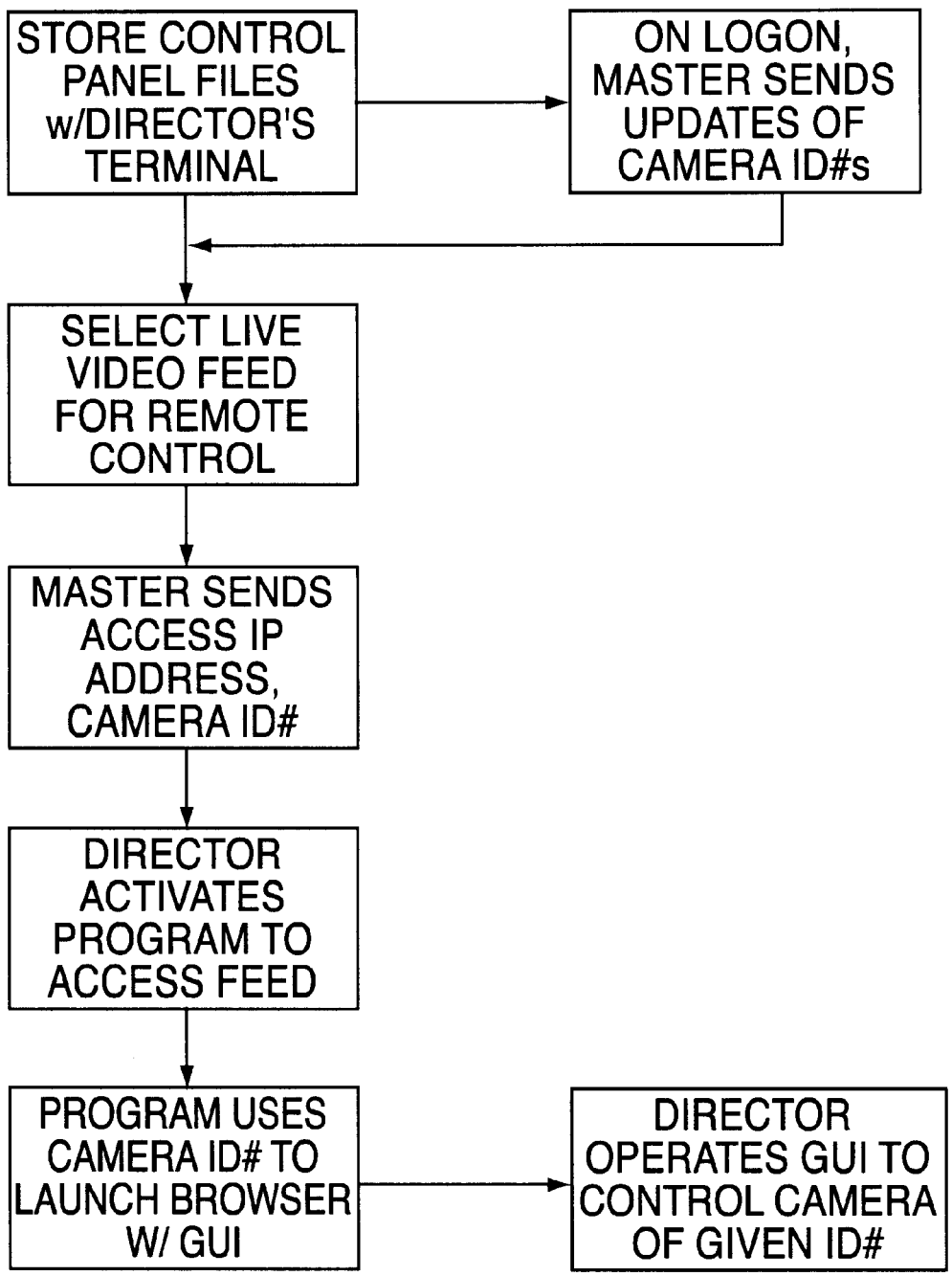
FIG. 8 is a logic diagram illustrating the process for converting inputs to the control panel GUI into remote control codes for a designated type of on-site video camera.

Referring to FIG. 8, a logic diagram illustrates a novel method provided in the present invention by which a universal control panel GUI can be used to provide different camera control command sets to remotely control different types of cameras. The universal control panel GUI is used with a browser loaded by a front-end video feed control program installed or downloaded to a computer used by a director. The director's computer also stores a plurality of control panel GUI files, each corresponding to a respective model, type, and/or brand of camera supported in the system. Any changes or additions to the control panel GUI files may be downloaded each time the director's computer is used to log on to the Master site. The Master server detects the presence of the video feed control program and automatically downloads any required updates. Each control panel GUI file contains the graphic file for the universal control panel GUI in Web page format, for display with the browser used on the director's computer. Each GUI file also contains links from inputs to the universal control panel GUI inputs to a specific set of command codes corresponding to a specific type of camera.

Thus, the director is presented with the same universal control panel GUI for remote control by browser of a wide range of different camera types, while the front-end video feed' control program transparently manages loading the proper control panel GUI file corresponding to the video camera type to be controlled. When the director logs on to the Master site and selects a live video feed for remote control, the Master Server sends an access code back to the director's terminal that includes a security passcode, the IP address of the Publishing Point for accessing the video feed, and the ID number of the type of camera installed on-site at the source for the video feed. The camera type number is previously supplied to the Master server upon input of video feed supply information by the local network affiliate to the propagation server at the local PoP, and updating by the local PoP server of the Master server's database for the Master Feed List. When the director activates the front-end program to access a video feed at a designated Publishing Point, the front-end program launches the director's browser using the proper control panel GUI file that corresponds to the indicated ID number of the video camera at the source site. When the director operates the universal control panel GUI, the linked command code set of the control panel file converts the director's inputs to the GUI into the text command codes that can be sent via Internet and recognized by the controller computer for that type of camera. In this manner, a director can use the same control panel GUI to control any of the types of video cameras supported in the system.

Figure 9:
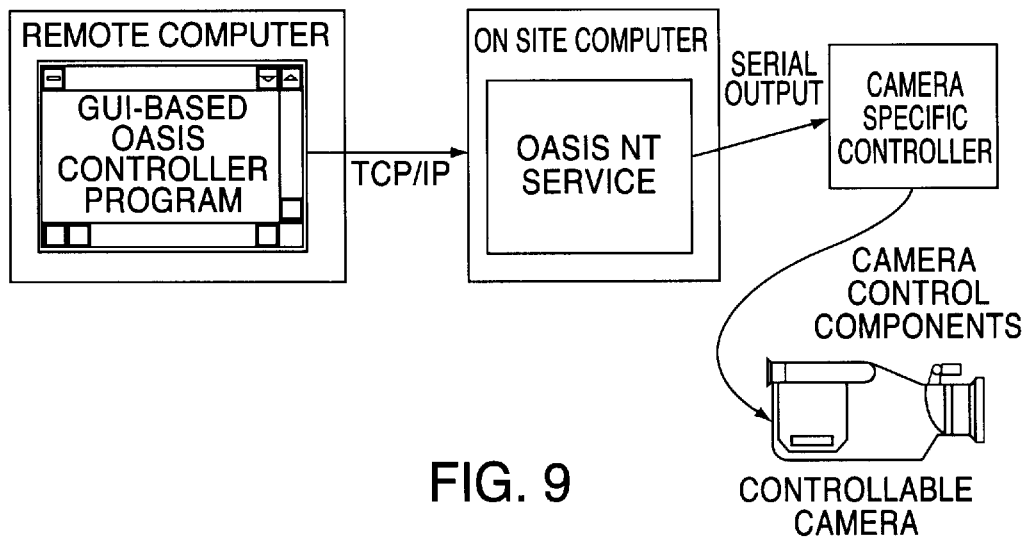
FIG. 9 is a diagram illustrating an example of conversion of input to the control panel GUI to control codes for a specific type of on-site video camera.

FIG. 9 is a diagram illustrating an example of conversion of input to the universal control panel GUI into text command codes for controlling a specific type of on-site video camera. In the preferred implementation, the control panel GUI file is stored as a Web page in HTML format, with the graphical elements of the control panel GUI for user input linked to the corresponding command codes.

As an alternative embodiment, the universal control panel GUI is loaded with the browser by the front-end program on the computer of a requesting party and provides a given set of universal camera control commands. The code conversion step for specific camera types is performed instead at the local PoP server. In this version, the universal command codes are routed through the local PoP server to the controller computers for the different video cameras. A conversion module is maintained with the PoP server for converting the universal command codes into command codes corresponding to a respective one of the different video camera types. The converted command codes are then routed by the local PoP server to the video camera computer for the video feed requested by the requesting party corresponding to the addressed video camera type.

Examples of System Applications

The video feed management system of the present invention facilitates the availability, transmission, and use of locally generated content wherever and whenever it is made available or occurs. This facility opens up a whole new universe of content for digital video production, digital TV programming, video-on-demand, pay-per-view, telemedicine conferencing, distance learning, video conferencing, video-enabled advertising, video-enabled customer services, sales, and other e-commerce services, etc. Two examples of end-user applications for locally-sourced video content managed by the global video feed management system are provided below.

Figure 10:
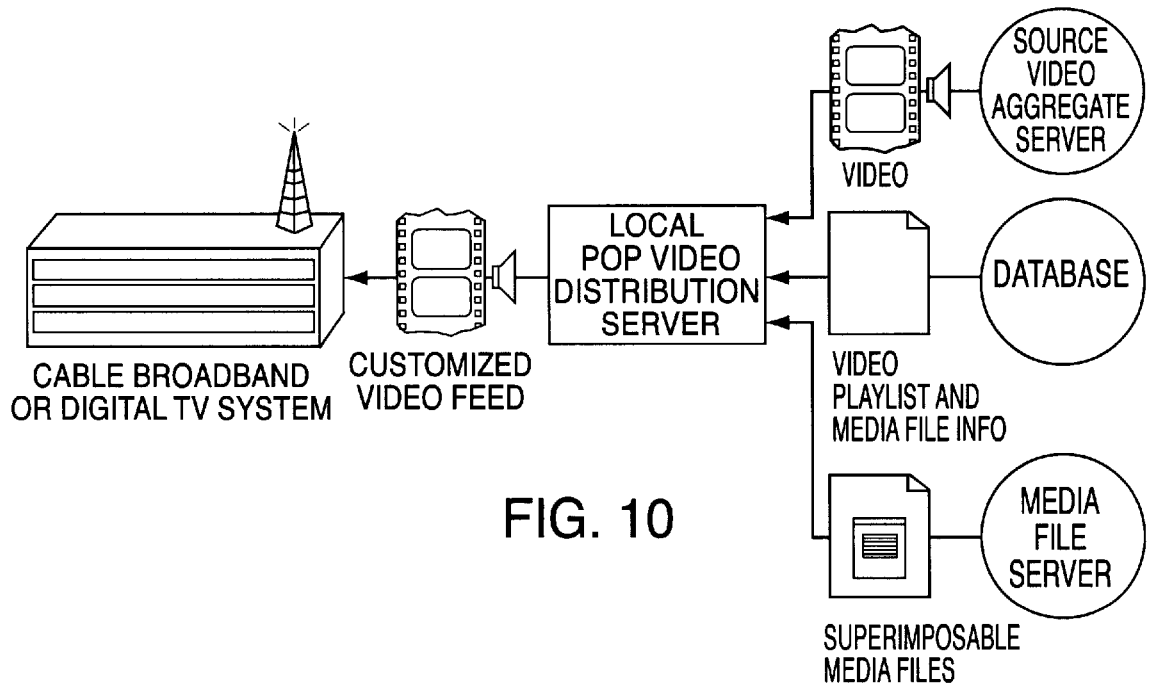
FIG. 10 is a diagram illustrating an example of taking a direct feed of live Video from the system's network and supplying it to a cable company for digital TV programming or broadband services.

In a first example, video feeds supplied to the local PoPs are transmitted as direct video feeds to TV broadcast and cable TV programming companies for production into TV programs. Such TV broadcast and cable TV programming companies can access locally sourced video feeds as intermediary users of the video feed management system. For new digital TV channels where high viewer choice, segmented audiences, and restricted production budgets are the norm, the video feeds can be injected into broadcast channels as direct feeds of streaming video content. For example, as shown in FIG. 10, a direct feed of live video from the system's network is supplied to the head-end of a cable broadband or digital TV system. With minimal wraparound of channel identification, sponsors, and advertising, the video content can be provided as a live TV program directly to the public. An analogy would be the C-SPAN channels where the public can view proceedings at legislative hearings, public forums, or performance centers with minimal editing. By co-locating the local PoP server for the system with the head-end of the cable TV company, the universe of video feeds managed by the system can be made available and propagated directly into cable TV programming to the public. The digital content can be adapted as digital signals to digital cable set top boxes, or converted to analog TV signals for older cable systems. For cable companies that offer broadband services through cable modems, the video content can also be multicast to distribution nodes in the cable system and widely accessed by broadband subscribers locally. Similarly, direct feed connectivity can be provided to ISPs linked to high-bandwidth lines (Ti, fractional Ti, DSL) provided by the telephone operating companies.

As a second example, the video feed management system of the invention can be used to facilitate the use of locally sourced video feeds in video-enabled advertising, e-commerce services, live events programming, and other video-enabled services on the Internet. The Master server can be used to automatically generate a video Web page which is hosted on the master site and linked to a requesting party's Web site. Upon receiving a request via Internet from a client company to use a video feed with a desired display presentation format, the Master server can arrange for access to the requested video feed and automatically generate the video Web page and link it to the client company's Web site.

Figure 11:
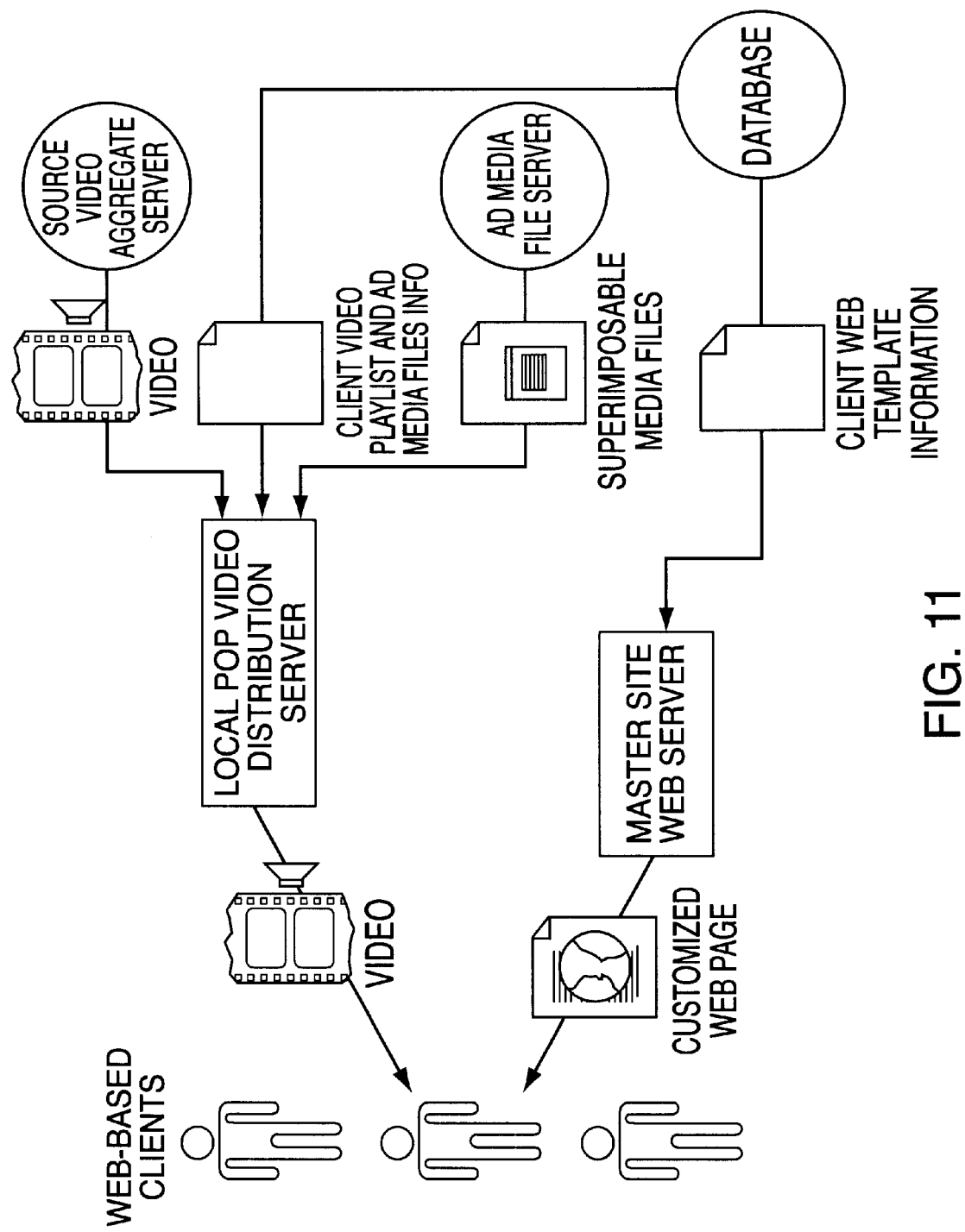
FIG. 11 is a diagram illustrating an example of taking a direct feed of live video from the system's network and automatically generating a live video-enabled ad.

As a specific example shown in FIG. 11, a direct feed of live video from the system's network is used to generate a live video ad for a business Web site for viewing on the Internet. At the Master site, a company requests access to a desired video feed to be used in a video ad to be linked to the company's Web site. The Master site offers the company a number of standard ad display templates to select from, typically having a main window for the video feed and fields along the borders for the company's name, logo, and product or service promotions. The company selects an ad template and video feed and uploads its graphics files for insertion in the fields for the company's name, logo, and product or service promotions. The Master site generates the video ad and assigns an IP address as a Publishing Point for the ad, which the company embeds in the link on its Web site to the video-enabled ad hosted on the Master site. When users visiting the company's Web site click on the link, they will be linked to the Publishing Point and the video-enabled ad will be transmitted to them.

Similarly, other types of licensed affiliates or broadband media production companies can request automatic generation of live events programming (sports, news, weather, traffic, cultural events) to be linked on the Internet to their sites. As described previously, the Master server can employ its media management program, Master Feed List, and Pricing Table to prepare billing statements to these client companies and payment statements to the video feed sources based upon its rate structure for the different display templates and video feeds.

As a further feature, the Master site can take a defensive measure against hackers delinking the video feed from its hosted video Web pages and using the source IP address to access the video feed for unauthorized purposes. The video feed image can be digitally superimposed with the company-supplied graphical elements to create a composite video image that is published directly from a Publishing Point as hosted by the Master Site. In this way, a hacker would be unable to de-link the video feed from the company-identifying elements of the ad, and would be unable to access the video feed by itself for unauthorized purposes.

Industrial and Commercial Applicability

The system of the present invention facilitates the availability, transmission, and use of locally-generated content for digital video production, digital TV programming, video-on-demand, pay-per-view, telemedicine conferencing, distance learning, video conferencing, video-enabled advertising, video-enabled customer services, sales, and other e-commerce services, etc., delivered online to users anywhere on the Internet. The system's business model is based on the recognition that the online public wants immediate, emotional experiences and that high-quality video content is essential to such experiences. The use of video content that covers live and/or local events, faces and places is expected to have a far greater impact on the viewing public than generic content. Any video camera having its feed connected to the video feed management system of the invention can thus become a portal to the world.

The system employs a network of locally-sited PoP servers through high-bandwidth connections so that locally generated video content can be distributed easily and quickly to users around the world. The local PoP servers can also be deployed synergistically by co-location at the head-ends of cable operating companies or high-bandwidth connections to telephone operating companies in their respective service areas. This strategy provides a high-bandwidth delivery system both for uploading video feeds to the system's network, and also for distributing the video content to end users.

Businesses will be enabled to deliver whole new categories of online video advertising and video-enabled services to customers using compelling live content. Video-enhanced e-commerce services will attract greater interest from online users, translating into increased online transactions for businesses. Such video-enhanced e-commerce services can include: (a) streaming video advertisements; (b) coverage of live, in-store, and other high-interest events from any location; (c) personalized customer service and product demonstrations; (d) video telephone calls with customer service representatives; and (e) personalized sales transactions and sales fulfillment. A business can readily become a source of live video content simply by having an on-site video camera installed at the location of an ad shoot, live in-store event, or customer service or sales center, and connecting its video feed to the video feed management system via the Internet. The video feed can then be accessed through the system's network by the business' video-enabled Web site. Customers anywhere can then log on to the business' Web site to view the live video content.

Other providers of live or on-demand multimedia services can connect to the video feed management system of the invention to create a powerful and extensive, global multimedia network. The global multimedia network may be coupled with a network management infrastructure as disclosed herein to facilitate multimedia-enabled e-commerce services worldwide which would permit businesses to tap into new revenue opportunities through the attraction of online multimedia content. The invention facilitates the creation of multimedia content by providing ready access to video feeds from sources around the world. Businesses can benefit from the greatly reduced costs saved by having a single point of contact for content and for media management services, and faster online implementation of multimedia-enabled e-commerce services.

The video feed management system of the invention is entirely scalable and will enable a universe of video cameras to be sited anywhere to capture live events, e.g., news events, sporting events, theatre, stage performances, schools, business conferences, in-store locations, sales centers, etc. When remotely-controlled video cameras are used, on-location shooting costs and production delays can be avoided or substantially reduced. The marked lowering of video production costs and convenience of handling production remotely via the Internet will allow a multitude of new video production companies, digital TV programming companies, and e-commerce and business services companies to create new content wherever and whenever an event of interest occurs.

While certain preferred embodiments of the invention have been described herein, it is understood that many modifications and variations may be devised given the above disclosed principles of the invention. It is intended that all such modifications and variations be considered as included within the spirit and scope of this invention, as defined in the following claims.

What is claimed is:

1. A video feed remote control system comprising:

(a) a plurality of video feeds generated from respective video cameras located on-site at a plurality of locations, said video cameras being of a predetermined different video camera types;

(b) a plurality of video-camera-computers operable with respective ones of the video cameras for controlling them to generate the respective video feeds therefrom and transmit them to a designated local video-propagation server, said video camera computers being connected to the Internet and addressable by respective IP addresses;

(c) at least one video-propagation server connected to the Internet for receiving via Internet video feeds from the respective video cameras located at the on-site locations;

(d) a master authorization server connected to the Internet for receiving requests via Internet from requesting parties for access to any of the video feeds transmitted to the at least one video-propagation server and granting a requesting party access to a requested video feed from the video-propagation server receiving the requested video feed; and (e) a universal control panel graphical user interface (GUI) provided on a browser-enabled computer operated by the requesting party for controlling any of the different video camera types used to generate the video feeds, wherein upon granting a requesting party access to a requested video feed, said master authorization server provides to the requesting party an identification of the video camera type and the IP address of the computer for the video camera generating the requested video feed to enable the requesting party to issue control signals for the corresponding video camera type to the IP address of the computer for the video camera generating the requested video feed, wherein said universal control-panel GUI and a plurality of control panel GUI files are provided with a browser-enabled computer of a requesting party, and each control panel GUI file corresponds to a respective one of the different video camera types, and enables a display of the, universal control panel GUI on the requesting party's computer and issues a respective set of command codes for inputs to the universal control panel GUI corresponding to the respective video camera type.

2. A video feed remote control system according to claim 1, wherein said universal control-panel GUI is provided as a browser-based GUI file to a browser-enabled computer of a requesting party, said at least one video-propagation server provides a link from the computer of the requesting party to the computers for the respective video cameras, and a command code conversion module is maintained with the at least one video-propagation server for converting universal command codes issued from the universal control panel GUI on the requesting party's computer into command codes corresponding to a respective one of the different video camera types.

3. An automated video Web page generating system comprising:

(a) a plurality of video feeds obtained from respective sources;

(b) at least one video-propagation server connected to the Internet for receiving the plurality of video feeds and transmitting a video feed via Internet as requested by a requesting party on the Internet;

(c) a master authorization server connected to the Internet for receiving a request via Internet from a requesting party to use any one of the video feeds in a requested display presentation format in conjunction with a video Web page to be linked to a Web site maintained by the requesting party; and (d) said master authorization server being provided with a video Web page generation module for automatically generating a video Web page in the requested display presentation format using the requested video feed, and linking the generated video Web page to the client company's Web site, wherein said master authorization server includes means for allowing the requesting party to select a display template from a plurality of stored display templates for different display presentation formats, and to upload the requesting party's identification graphics to the master server for incorporation into a selected display template.

4. An automated video Web page generating system according to claim 3, wherein said system is used to automatically generate video Web page ads for a client company, said display templates include a selection of ad display templates for use with the client company's identification graphics and any requested video feed.

5. An automated video Web page generating system according to claims 3, wherein said system is used to automatically generate video Web pages for live events programming of a video production company which are hosted by the master authorization server and linked to the video production company's Web site.

* * * * *